Patented Feb. 6, 1940

2,189,590

UNITED STATES PATENT OFFICE 2,189,590

HIGHLY FLEXIBLE SHEETING AND PROCESS OF PREPARING THE SAME

Carl J. Malm, Rochester, N. Y., assignor, by mesne assignments, to Eastman Kodak Company, Rochester, N. Y., a corporation of New Jersey No Drawing. Application December 18, 1934, Serial No. 758,063

3 Claims. (Cl. 106—40)

The present invention relates to highly flexible sheeting prepared by coating out a skin from a solution of slightly hydrolyzed cellulose acetate butyrate in a solvent consisting of propylene chloride and a lower alcohol, particularly methyl alcohol. The present application is a continuation-in-part of my application Serial No. 551,545, filed July 17, 1931, which matured into Patent No. 2,006,362.

The preparation of sheets or skins of organic acid esters of cellulose by coating them out from an acetone solution in the preparation of non-inflammable photographic film, wrapping material, etc., is well known and in fact is the commonly employed method at the present time. The most common organic acid ester of cellulose employed is the acetate, which, in commercial practice, is hydrolyzed to acetone-solubility before use. A skin or sheet of high-grade cellulose acetate coated out from acetone and having a thickness of approximately .005 inch may exhibit an average flexibilty of approximately six folds on a modified Schopper fold-tester. The flexibility of sheets of ordinary commercial cellulose acetate coated from acetone is, as a rule, about 3—4 folds.

One object of my invention is to prepare a sheet or skin of an organic cellulose ester which has flexibility properties far above and beyond those exhibited by sheets of this nature which are employed commercially at the present time. Another object of my invention is to prepare a sheet or skin of an organic ester of cellulose which, when unplasticized, will exhibit flexibilities equal or superior to that exhibited by organic cellulose ester sheets or skins which have been plasticized. Another object of my invention is to employ a slightly hydrolyzed cellulose acetate butyrate in the preparation of superflexible sheets, this ester when coated out from acetone giving sheets which are either brittle or of a flexibility comparable with those prepared from an acetone solution of cellulose acetate.

I have found that a slightly hydrolyzed cellulose acetate butyrate having a butyryl content of at least 8% (based on the ester) and in which at least one-half of 1% and not more than 10% of the combined acyl content of the ester has been hydrolyzed off or replaced by hydroxyl group, may, when dissolved in a solvent consisting of propylene chloride and a lower alcohol, the former in predominating proportions, form sheets or skins of surprisingly high flexibility.

I have found that the sheets or skins prepared in this manner exhibit flexibilities, though the products are unplasticized, which are equal or superior to those of sheets of plasticized organic esters of cellulose. I have found that the addition of a plasticizer to my product does not markedly affect its flexibility, thus tending to show that the conditions induced by a plasticizer in the common run of cellulose ester products are already present in my product without the necessity of diluting or adulterating the cellulose ester with an added plasticizer.

My invention comprises the colloidizing of a slightly hydrolyzed cellulose acetate butyrate with a solvent consisting of propylene chloride and a lower alcohol, especially methyl alcohol, the former being present in a predominating amount. I have found that the solvent mixtures consisting of 70-90% propylene chloride and the remainder of methyl alcohol or other lower alcohol are unusually effective in the preparation of sheets of great flexibilty.

The following data illustrate the unusual results which are obtained by preparing sheets or skins according to my invention:

Slightly hydrolyzed cellulose acetate butyrates of different butyryl contents and different degrees of hydrolysis prepared by hydrolyzing cellulose acetate butyrate for a short time, such as 50-200 hours, in accordance with the process described in the Malm & Fletcher Patent No. 2,026,583, dated January 7, 1936, were coated out employing propylene chloride-methyl alcohol as the solvent, various proportions of this mixture being employed. The results obtained were as follows:

| Percent acetyl | Percent butyryl | Propylene-chloride-methyl alcohol | Flexibility in folds | Flexibility when coated from acetone |
|---|---|---|---|---|
| 39.9 | 9.9 | 85—15 | 75 | Brittle. |
| 36.0 | 9.3 | 85—15 | 110 | 2. |
| 35.9 | 12.0 | 90—10 | 24 | Brittle. |
|  |  | 80—20 | 60 |  |
| 31.7 | 11.4 | 90—10 | 36 | 10. |
|  |  | 80—20 | 50 |  |
| 30.4 | 16.6 | 90—10 | 45 | Brittle. |
|  |  | 80—20 | 36 |  |
| 27.2 | 16.8 | 90—10 | 53 | 12. |
|  |  | 80—20 | 40 |  |
| 14.3 | 38.1 | 90—10 | 35 | Brittle. |
|  |  | 80—20 | 32 |  |
| 13.0 | 38.1 | 90—10 | 31 | 6. |
|  |  | 80—20 | 29 |  |
| 10.9 | 37.0 | 90—10 | 58 | 8. |
|  |  | 80—20 | 47 |  |
| 9.8 | 36.4 | 90—10 | 85 | 7. |
|  |  | 80—20 | 73 |  |
| 9.4 | 33.8 | 90—10 | 190 | 10. |
|  |  | 80—20 | 66 |  |
| WITH 15% TRIPHENYL PHOSPHATE | | | | |
| 39.9 | 9.9 | 85—15 | 75 | 3. |
| 36 | 9.3 | 85—15 | 94 | 7. |

It may be seen from the above data that this combination of a slightly hydrolyzed cellulose acetate butyrate having a butyryl content above 8% and a solvent consisting of propylene chloride-alcohol in which the former is 70-90% of the solvent, exhibits flexibilities which are many times more flexible than that of the cellulose acetate sheets which are employed commercially at the present time for photographic film, etc.

The theory might be advanced that the exceptional flexibility of the skins or sheets in the present invention might be due to the presence of residual solvent therein which acts as a plasticizer. However, this theory has been proven false by heating sheets of this nature to drive off any residual solvent and yet, after such treatment the sheet or skin exhibited substantially the same flexibility as it did before this treatment was given.

Although methyl alcohol with propylene chloride has been found to give high flexibilities and is satisfactory in preparing sheets in accordance with the present invention, nevertheless, other lower alcohols can be employed and sheets with high flexibilities will be obtained. It is to be understood that the present invention is not restricted to the use of methyl alcohol as the lower alcohol, although due to the high flexibilities when that alcohol is employed, its use is preferred in the present invention. Other alcohols which may be employed as the lower alcohol, either mixed or instead of methyl alcohol, are:

Ethyl alcohol
Normal-propyl alcohol
Iso-propyl alcohol
Normal-butyl alcohol
Iso-butyl alcohol
Tertiary butyl alcohol In some cases the flexibility of a skin coated out from propylene chloride-alcohol in accordance with the present invention may be lower than the value given, however, this has been found to be due to the skin not being stripped from the coating surface before it is completely cured. I have found that when these skins or sheets are stripped from the coating surface before complete curing, the fold tolerance is higher than when the skins are cured on the coating surface. However, even the latter skins prepared in accordance with the present invention exhibit high flexibilities.

The various advantages of the sheet or skin produced by my process over those which are employed at the present time are apparent. For example the sheets produced by my invention need not be plasticized to procure greatly superior flexibilities so that the reclamation of scrap sheeting, which has been made by my process, creates no problem of separating various materials to obtain the cellulose ester in pure form that is presented by the reclamation of cellulose esters which must be plasticized to obtain sheets of satisfactory flexibility. Also, there is no danger, in the case of the sheets produced by my process, of a decrease in flexibility of the sheets due to a loss of plasticizer as the flexibility is an inherent quality of the sheet produced according to my invention and not due to the addition of any added material.

As was pointed out heretofore, the term "slightly hydrolyzed cellulose acetate butyrate" employed herein refers to a cellulose acetate butyrate having a butyryl content of at least 8% and which has been hydrolyzed to a point at which at least one-half of 1% and not more than 10% of the combined acyl content has been hydrolyzed off.

The sheets produced according to my process may be used in any instance where cellulose ester sheeting is employed at the present time. Due to its high flexibilities it is available for the manufacture of photographic film and of thin sheeting, for wrapping purposes. These sheets, due to their toughness, are adapted for reinforcing materials, especially those of a breakable nature, such as paper, glass, wood, as well as leather, metal, fabric, etc. My invention may also be employed for other purposes than making sheets or skins such as artificial silk manufacture, lacquering and overcoating in general, artificial leather, etc. Various other uses of the present invention will suggest themselves to those skilled in the art.

If desired, various materials which are compatible may be added in the preparation of products according to my invention. For instance, triphenyl phosphate may be added to reduce inflammability. Although unnecessary, if the operator desires, he may add a known plasticizer, cellulose esters, resins or other compatible plastic materials to impart to the resulting product the characteristics desired.

What I claim is:

1. A flowable film forming solution comprising a cellulose acetate butyrate which has a butyryl content of at least 8% and from which at least one-half of 1% and not more than 10% of the combined acyl content has been hydrolyzed off and a solvent mixture essentially consisting of 7–9 parts of propylene chloride and 3–1 parts of a lower aliphatic monohydroxy alcohol, capable of producing a transparent, flexible sheet upon evaporation of the solvent from a thin layer of the solution.

2. A flowable film forming solution comprising a cellulose acetate butyrate which has a butyryl content of at least 8% and from which at least one-half of 1% and not more than 10% of the combined acyl content has been hydrolyzed off and a solvent mixture essentially consisting of 7–9 parts of propylene chloride and 3–1 parts of methyl alcohol, capable of producing a transparent, flexible sheet upon evaporation of the solvent from a thin layer of the solution.

3. A highly flexible sheet resulting from the coating out of a cellulose acetate butyrate which has a butyryl content of at least 8%, and from which at least one-half of 1% and not more than 10% of the combined acyl content has been hydrolyzed, from its solution in a solvent mixture essentially consisting of 7–9 parts of propylene chloride and 3–1 parts of a lower aliphatic monohydroxy alcohol.

CARL J. MALM.